United States Patent
Morrison

(10) Patent No.: US 10,768,943 B2
(45) Date of Patent: Sep. 8, 2020

(54) ADAPTER CONFIGURATION OVER OUT OF BAND MANAGEMENT NETWORK

(71) Applicant: Hewlett Packard Enterprise Development LP, Houston, TX (US)

(72) Inventor: Corey Casey Morrison, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 98 days.

(21) Appl. No.: 15/847,252

(22) Filed: Dec. 19, 2017

(65) Prior Publication Data

US 2019/0188003 A1 Jun. 20, 2019

(51) Int. Cl.
| G06F 16/27 | (2019.01) |
| G06F 9/4401 | (2018.01) |
| H04L 12/12 | (2006.01) |
| G06F 9/445 | (2018.01) |

(52) U.S. Cl.
CPC .......... G06F 9/4416 (2013.01); G06F 9/4408 (2013.01); G06F 9/44505 (2013.01); H04L 12/12 (2013.01); G06F 16/27 (2019.01)

(58) Field of Classification Search
CPC .... G06F 9/4416; G06F 9/44505; G06F 16/27; H04L 12/12
USPC ........................................................ 713/1, 2
See application file for complete search history.

(56) References Cited

U.S. PATENT DOCUMENTS

| 6,754,718 | B1 | 6/2004 | Dobberpuhl et al. |
| 7,321,927 | B2* | 1/2008 | Nakajima ............. G06F 9/4416 709/221 |
| 7,886,139 | B2 | 2/2011 | Hernandez et al. |
| 8,719,534 | B1* | 5/2014 | Ray, III .................. G06F 3/067 711/154 |
| 8,924,499 | B2* | 12/2014 | Allen .................. H04L 41/0846 709/213 |
| 9,003,000 | B2 | 4/2015 | Currid et al. |
| 9,727,028 | B2* | 8/2017 | Clissold .............. G06F 9/44505 |
| 2002/0162010 | A1* | 10/2002 | Allen .................. G06F 11/2294 726/26 |
| 2003/0088658 | A1 | 3/2003 | Davies et al. |

(Continued)

OTHER PUBLICATIONS

Tseng, J of al., "Internet Storage Name Service (iSNS)," Sep. 2005, 123 pages, https://tools.ietf.org/pdf/rfc4171.pdf.

(Continued)

*Primary Examiner* — Aurel Prifti
(74) *Attorney, Agent, or Firm* — Hewlett Packard Enterprise Patent Department

(57) ABSTRACT

Examples described herein include receiving contact information of a management controller for a host device and querying the management controller for a supported data network adapter over a management network. In response to a determination that the host device comprises a supported data network adapter, identifying information of a storage array is transmitted to the management controller. Examples also include receiving a unique identifier of a storage volume associated with the storage array and configuring, over the management network, the supported data network adapter to boot from the storage volume over a data network that is out of band from the management network.

13 Claims, 4 Drawing Sheets

(56) References Cited

U.S. PATENT DOCUMENTS

| | | | |
|---|---|---|---|
| 2005/0018672 A1* | 1/2005 | Dropps | G06F 21/85 370/389 |
| 2005/0169258 A1* | 8/2005 | Millet | H04L 49/355 370/389 |
| 2006/0171384 A1* | 8/2006 | Graves | H04L 63/101 370/389 |
| 2006/0218388 A1 | 9/2006 | Zur et al. | |
| 2007/0136447 A1* | 6/2007 | Nakajima | H04L 67/1097 709/220 |
| 2007/0192466 A1* | 8/2007 | Nahum | G06F 9/4416 709/223 |
| 2007/0206224 A1* | 9/2007 | Nagashima | G06F 3/0607 358/1.16 |
| 2009/0006501 A1* | 1/2009 | Bharadwaj | H04L 67/1097 |
| 2009/0164630 A1* | 6/2009 | Hirata | H04L 63/0236 709/225 |
| 2009/0219827 A1* | 9/2009 | Chen | H04L 49/357 370/252 |
| 2009/0282135 A1* | 11/2009 | Ravindran | G06F 9/4416 709/222 |
| 2010/0064023 A1 | 3/2010 | Basham et al. | |
| 2010/0235596 A1 | 9/2010 | Carpenter et al. | |
| 2013/0111197 A1* | 5/2013 | Nadon | G06F 8/60 713/1 |
| 2013/0262711 A1* | 10/2013 | Louzoun | G06F 9/4411 710/9 |
| 2014/0164752 A1* | 6/2014 | Venkiteswaran | G06F 9/4416 713/2 |
| 2015/0006951 A1* | 1/2015 | Gurram | G06F 11/2028 714/4.12 |
| 2016/0203000 A1* | 7/2016 | Parmar | G06F 9/4416 713/2 |
| 2017/0220264 A1* | 8/2017 | Sokolov | G06F 3/064 |
| 2018/0026863 A1* | 1/2018 | Hughes | H04L 43/06 709/224 |
| 2018/0074717 A1* | 3/2018 | Olarig | G06F 11/30 |
| 2018/0335958 A1* | 11/2018 | Wu | G06F 3/0613 |

OTHER PUBLICATIONS

Broadcom, "Emulex® Drivers for VMware ESXi for OneConnect® Adapters," Dec. 30, 2016, Version 11.2, 136 Pgs., <https://docs.broadcom.com/docs-and-downloads/oem/support/ccx/rt11.2.1/11.2.1153.25/vmware_manual_ccx.pdf>.

Cisco Systems, Inc., "Installation notes for iSCSI Driver Version 3.2.0.5 for Linux," 2002, 18 Pgs. <http://linux-iscsi.sourceforge.net/README>.

NetApp, Inc., "NetApp® E-Series Storage Systems Concepts for SANtricity™ ES Storage Manager Version 10.86," (Research Paper), Aug. 2014, 136 Pgs., https://library.netapp.com/ecm/ecm_download_file/ECMP1189231.

QLogic Corporation, "QLogic iSCSI Boot Software Initiator README," 2015, 10 Pgs., <ftp://ftp.supermicro.com/driver/Broadcom/B57BCMCD_T7.12b.4.1/dos/onchip_firmware/i.

Brocade, "Boot LUN Zoning" and "Fabric-Assigned PWWN", Brocade Fabric OS Administration Guide, 8.0.x, Aug. 27, 2017, pp. 1-2, 388-391, and 495-500; <https://docs.broadcom.com/doc/12380080>.

Cavium, Inc., "Automating and Simplifying SAN Provisioning for QLogic Enhanced Gen 5 (16Gb) and Gen 6 (32Gb) Fibre Channel Adapters," Technology Brief, Dec. 2017, <https://www.marvell.com/content/dam/marvell/en/public-collateral/fibre-channel/marvell-fibre-channel-automating-and-simplifying-san-provisioning-for-gen5-and-gen6-technology-brief-2017-12.pdf>.

Marvell, "Marvell StorFusion Fabric Assigned Port Worldwide Name (FA-WWN) with Marvell QLogic Fibre Channel Adapters," Aug. 31, 2019, https://www.marvel.com/content/dam/marvell/en/public-collateral/hpe/hpe-marvell-appnote-2600-storfusion-fa-wwn.pdf>.

* cited by examiner

US 10,768,943 B2

ADAPTER CONFIGURATION OVER OUT OF BAND MANAGEMENT NETWORK

BACKGROUND

Entities may use networks comprising of host devices and storage arrays to perform data operations. The host device may have multiple connective interfaces or adapters allowing the host device to communicate to the storage array.

BRIEF DESCRIPTION OF THE DRAWINGS

The following detailed description references the drawings, wherein.

DETAILED DESCRIPTION

Figure 1:
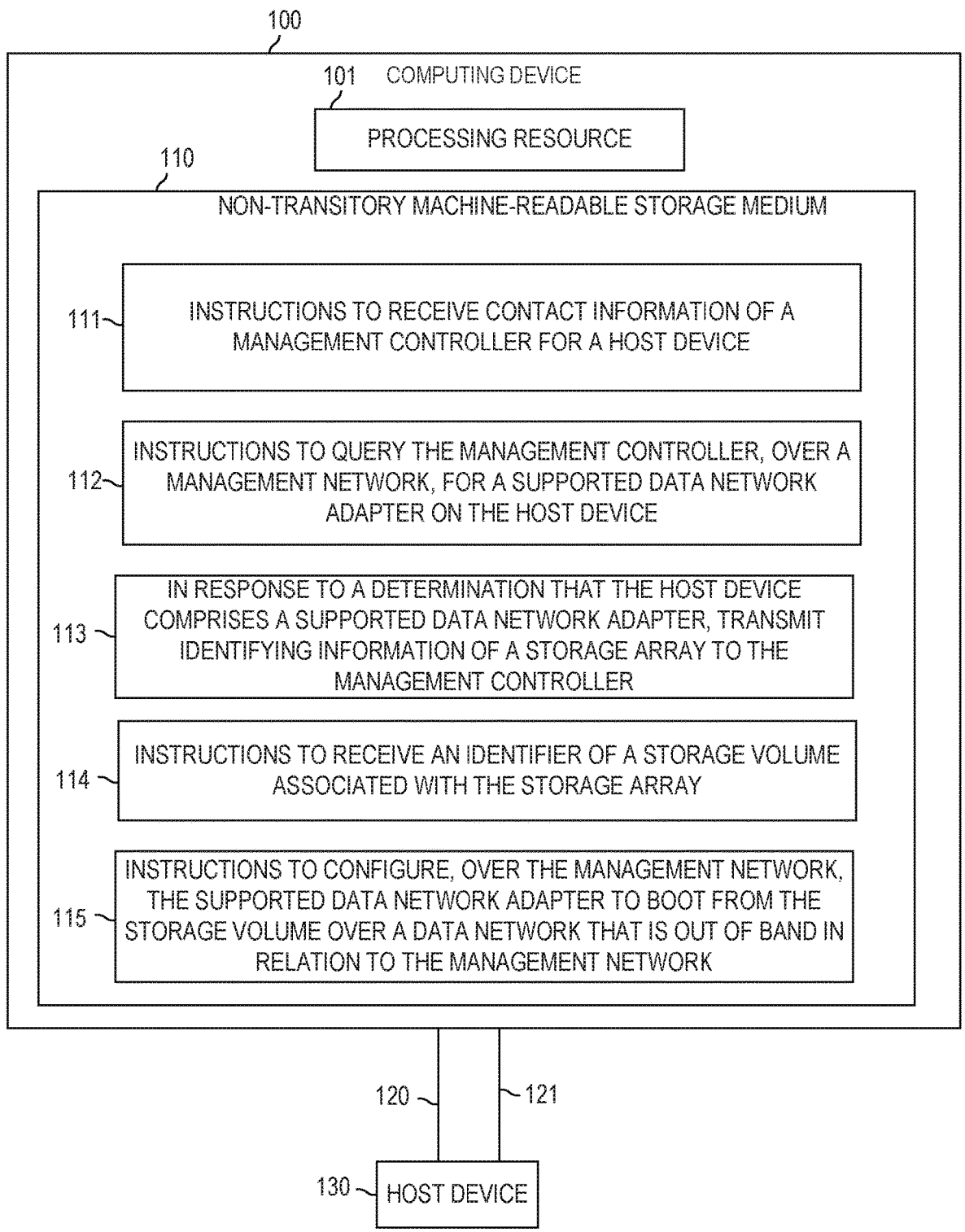
FIG. 1 is a block diagram of a computing device to configure a host device adapter, according to some examples.

A computing device (e.g., a host device running applications) may be connected to a network (e.g., storage area network (SAN), etc.) that allows the computing device access to data (e.g., read and/or write commands, etc.) stored on other computing devices (e.g., storage array, etc.) in the network. A host device in such storage networks may have multiple adapters to communicate to the network to which they are connected. The adapters may be configured differently depending on the storage environment. For example, an adapter in a host device running one operating system may be configured differently from an adapter in a host device running another operating system.

In some examples, the host device may use the data on the network to boot up the adapters. For example, a host device attached in a SAN may be configured such that the adapters on the host device use a storage volume (e.g., a logical unit, etc.) presented on the SAN to boot from. However, setting up the configurations on the host device to boot from the network-stored data is a manual process, involving an administrator to first boot the host device to a pre-boot configuration (e.g., using a UEFI-based menu, a legacy BIOS Option ROM, etc.) and then enter in the details (e.g., location of the storage array and the logical unit number, etc.) into the host device. In situations where there are multiple adapters, multiple host devices, and/or multiple storage volumes to use, this process may be time-demanding and involve multiple host device resets. This results in inefficiencies and system down time where portions of the network may not be operational. Additionally, this manual process allows an adapter to only be statically defined (e.g., the adapter may be tied to one storage volume, or have one single worldwide name, etc.). In order to use another storage volume or another identifying information, the administrator may need to repeat the process over again (e.g., return to the pre-boot configuration, enter in details, etc.).

Examples disclosed herein discuss methods that allow adapters on host devices to be configured to boot from a storage volume stored on the storage array using a management controller of the host device. An administrator may access the storage array and enter in contact information (e.g., IP address) for a management controller of a host device that is attached to the storage array via a data network and an out of band management network. The storage array contacts the management controller over the management network and queries the management controller for the existence of an adapter that is compatible with the data network. The storage array then sends its identifying information (e.g., World Wide Name (WWN)) to the management controller. The storage array queries the management controller for the adapter's identifying information (WWN) and enters the adapter's identifying information into the same data network zone as the storage array. In other examples, the storage array may transmit new identifying information to the management controller such that the adapter takes on the new WWN. The storage array then sends an identifier (e.g., logical unit number (LUN)) of a storage volume on the storage array to the management controller. This identifier tells the adapter which storage volume to boot from. Thus, examples discussed herein allow the configuration of multiple adapters via the interaction with one storage array over a management network that is out of band in relation to the data network. The examples discussed herein also allow flexibility in adapter configuration without involving a pre-boot environment in the host device.

In some examples, a computing device is provided with a non-transitory machine-readable storage medium. The non-transitory machine-readable storage medium comprises instructions that, when executed, cause a processing resource of a storage array to receive contact information of a management controller for a host device, to query the management controller for a supported data network adapter over a management network, and, in response to a determination that the host device comprises a supported data network adapter, transmit identifying information of the storage array to the management controller. The instructions, when executed, also cause the processing resource to receive an identifier of a storage volume associated with the storage array and configure the supported data network adapter to boot from the storage volume. The configuration is transmitted over the management network and the boot is via a data network that is out of band in relation to the management network.

In some examples, a storage array comprises an input engine, a query engine, and a boot engine. The input engine is to receive contact information of a management controller for a host device. The query engine is to query the management controller for a supported adapter on the host device. The querying is transmitted over a management network. In response to a determination that the host device comprises a supported adapter, a boot engine is to send identifying information of the storage array to the management controller and to configure the supported adapter to boot from a storage volume associated with the storage array. The boot is via a data network that is out of band in relation to the management network.

In some examples, a method comprises receiving, at a processing resource of a storage array, contact information of a management controller for a host device connected to the storage array by a data network and an out of band management network. The method also includes querying, by the processing resource, the management controller for a supported adapter on the host device over the management network. In response to a determination that the host device comprises a supported adapter, the method includes configuring the supported adapter to boot from a storage volume associated with the storage array. The configuration is via the management network and the boot is via the data network.

Referring now to the figures, FIG. 1 is a block diagram of a computing device 100 to configure an adapter of a host device. As used herein, a "computing device" may be a server, computer networking device, chip set, desktop computer, workstation, or any other processing device or equipment. In some examples, computing device 100 is a storage array.

Computing device 100 includes a processing resource 101 and a machine-readable storage medium 110. Machine-readable storage medium 110 may be in the form of non-transitory machine-readable storage medium, such as suitable electronic, magnetic, optical, or other physical storage apparatus to contain or store information such as instructions 111, 112, 113, 114, 115, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and/or a secondary memory. The secondary memory can, for example, include a nonvolatile memory where a copy of software or other data is stored. In some examples, where computing device 100 is a storage array, a portion of the machine-readable storage medium may be persistent storage space (e.g., rotating disks or platters paired with magnetic heads and a moving actuator arm in HDDs, integrated circuit assemblies in SSDs, etc.) used to store data originating from host clients (e.g., in a data backup process).

In the example of FIG. 1, instructions 111, 112, 113, 114, and 115 are stored (e.g., encoded) on storage medium 110 and are executable by processing resource 101 to implement functionalities described herein in relation to FIG. 1. In some examples, machine-readable storage medium 110 may include additional instructions, like, for example, the instructions to implement some of the functionalities described in relation to storage array 200 of FIG. 2 or storage array of FIG. 4. In some examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, 114, and 115, as described herein.

In some examples, and as shown in FIG. 1, computing device 100 is communicatively coupled to a host device 130 through at least two communication networks 120 and 121. In some examples, communication networks 120 and 121 may each be a wireless network, a wired network, or a combination thereof. In some examples, communication networks 120 and 121 may each be an individual network or a collection of many such individual networks interconnected with each other and functioning as a single large network (e.g., the Internet or an intranet). In some examples, communication networks 120 and 121 may each be implemented as a local area network (LAN), wide area network (WAN), etc.

Communication network 120 is out of band in relation to communication network 121. As used herein, an out of band communication network provides connectivity between computing devices even when the other communication networks connected to the same devices are unavailable. Thus, communication network 120 may provide connectivity between computing device 100 and host device 130 even when communication network 121 is unavailable. Similarly, communication network 121 may provide connectivity between computing device 100 and host device 130 even when communication network 120 is unavailable. Thus, communication network 121 is also out of band in relation to communication network 120. In some examples, a communication network that is out of band in relation to another communication network may communicate using network components (e.g., switches, servers, etc.) that are independent from each other.

In some examples, communication network 120 may be a data network. Data network 120 may handle I/O data access requests (i.e. storage requests) throughout network 120, including to and from host device 130 and computing device 100. Data network 120 does not handle management traffic. In some examples, communication network 121 may be a management network. Management network 121 may be used to control connected computing devices (such as computing device 100 and host device 130).

For example, management network 121 may be used for health monitoring, device configuration, network configuration, etc. As viewed from an administrative side, an out of band communication network may provide access to and/or control of computing devices connected to the out of band communication network even when other networks connected to the same devices are unavailable. Thus, because management network 121 is out of band in relation to data network 120, management network 121 may provide access to and/or control of computing device 100 and/or host device 130 even in situations where data network 120 is unavailable.

In some examples, management network 121 may utilize internet based protocols such as Transmission Control Protocol (TCP). Internet Protocol (IP), with a physical layer based on Ethernet or Address Resolution Protocol (ARP). In some examples, data network 120 may utilize various protocols suitable for storage networks, including but not limited to Fiber Channel (FC), Fiber Channel over Ethernet (FCoE), Internet Small Computer Systems Interface (iSCI), iSCSI Extensions for RDMA (iSER), etc. Thus, in some examples, data network 120 may also be used for both storage requests and other network traffic. Similarly, in some examples, management network 121 may also be used for other traffic (e.g., storage requests). In these examples, data network 120 and management network 121 are out of band with each other with regard to computing device 100 and host device 130. In other words, data network 120 may be also be a management network for other computing devices but not computing device 100 and host device 130 and management network 121 may be a data network for other computing devices but not computing device 100 and host device 130.

In other examples, data network 120 and/or management network 121 are dedicated channels for their specific type of traffic. For example, in these examples, management network handles solely data for management functions.

In some examples, data network 120 may be divided into at least one zone (including, but not limited to one zone, two zones, three zones, etc.) As used herein, a zone may be a sectioned-off part of a communication network where devices (and/or hardware on that devices) in that specific zone may communicate with other devices in that specific zone but may not communicate with devices outside of that specific zone. Thus, a zone may designate a communication boundary; devices not in the zone cannot see devices in the zone. In some examples, the boundaries of the zone may be controlled by an administrator of the network. In some examples, the boundaries of the zone may be controlled by the devices themselves. For example, an administrator may provide permission for devices in a network to self-zone. Additionally, devices and/or hardware on a device (e.g., ports, adapters, etc.) may be added or removed from a zone by a network administrator. Thus, a zone may be modified.

Instructions 111 may be executable by processing resource 101 such that computing device 100 receives contact information of a management controller for host device 130. In some examples, management controller of host device 130 may be comprised of a dedicated processing resource that receives information on the physical state of the hardware (e.g., adapters, etc.) on host device 130 using sensors, etc. The management controller may allow an administrator to control and monitor host device 130. In some examples, management controller is a baseboard management controller (BMC).

Contact information of the management controller may be a unique address for the management controller on management network 121. The unique address allows devices to connect to the management controller over management network 121. In some examples, the contact information may be an IP address. In some examples, computing device 100 may receive the contact information from a user (e.g., an administrator, etc.) via a user interface.

Instructions 112 may be executable by processing resource 101 such that computing device 100 queries the management controller for a supported data network adapter on the host device. Thus, computing device 100 may contact the management controller on host device 130 using the contact information received. The querying of the management controller is over (i.e. transmitted over) management network 121. In some examples, computing device 100 may use an interface standard such as an application programming interface (API) (e.g., Redfish, etc.) to query the management controller. In some examples, the query may be specifically directed to whether or not a supported adapter is present. In other examples, the query may be general to get an inventory of what types of adapters are present on host device 130. Based on the response, computing device 100 may then determine whether there are supported adapters.

As used herein, an adapter may be a device on the host device that includes hardware and/or software components that converts transmitted data from one form to another. As used herein, a supported adapter is an adapter that is compatible with the protocol used by the network over which communication is desired. In other words, the supported adapter may convert signals sent internally in host device 130 into a form that may be sent over the desired network. Additionally, it may convert signals received by host device 130 into a form that may communicated internally through host device 130. For example, the design of a storage system may be such that the adapter is set up to receive and send information over data network 120. Data network 120, in some examples, may use fiber channel protocol. Accordingly, computing device 100 may query the management controller on host device 130 to determine whether the host device 130 comprises an adapter that supports (e.g., is compatible with) fiber channel protocol.

Instructions 113 may be executable by processing resource 101 such that, in response to a determination that the host device 130 comprises a supported adapter, computing device 100 transmits identifying information of a storage array to the management controller. In some examples, computing device 100 is the storage array.

The identifying information may be an alphanumeric character that is unique to the storage array and identifies the storage array in the network over which the adapter is designed to receive information. For example, the identifying information may be a world wide name (WWN) that is associated with the storage array. The storage array may already physically connected to host device 130 via the network over which the adapter is designed to receive information. By sending the WWN to the management controller of host device 130, management controller may ensure that adapter recognizes the physical connection.

In some examples, computing device 100 transmits the identifying information of the storage array over a different network than the one that the adapter is designed to receive information over. For example, the identifying information of the storage array may be sent over management network 121 and the adapter may be designed to receive information (e.g., storage requests) over data network 120. Accordingly, the identifying information that is transmitted reflects how the storage array is identified in the data network 120 and may or may not reflect how the storage array is identified in the management network 121. The identifying information allows the supported adapter to know where the end point is over the data network 120 when it is time for the supported adapter to boot.

Instructions 114 may be executable by processing resource 101 such that computing device 100 receives an identifier of a storage volume associated with the storage array. In some examples, computing device 100 may receive the identifier from a user via a user interface. The identifier may be an alphanumeric character that points to a specific storage volume implemented by the storage array. In some examples, the storage array may have at least one physical device (e.g., one drive, two drives, etc.) and the storage volume may use of all of these devices. In other examples, the storage volume may use less than all of these devices (e.g., one device out of two devices, etc.) In either of these examples, the storage volume may be considered as being one volume (even though the data may be stored on multiple different underlying physical devices) that is identified by the identifier. Non-limiting examples of identifier includes a logical unit number (LUN). The identifier may be of a storage volume from which the user wishes the supported adapter on host device 130 to use to boot.

Instructions 115 may be executable by processing resource 101 such that computing device 100 configures the supported data network adapter to boot from the storage volume. The configuration itself is done over management network 121 while the configuration is for booting over the data network 120. In other words, the information for configuration is transmitted over management network 121 while the data for booting is transmitted over data network 120. Thus, in some examples, instructions 115 includes instructions for computing device 100 to transmit the identifier of the storage volume to the management controller on the host device 130 over management network 121. This allows the management controller to instruct the supported adapter as to which storage volume is the desired storage volume.

Additionally, in some examples, instructions 115 may include instructions for computing device 100 to query, over the management network 121, the management controller for identifying information of the supported adapter. Identifying information of the supported adapter may be an alphanumeric character that is unique to the supported adapter and identifies the supported adapter in the network over which the adapter is designed to receive the information. For example, the identifying information may be a world wide name (WVVN) that is associated with the supported adapter. In some examples, the identifying information may be assigned to the supported adapter at manufacturing of the host device. Instructions 115 may also include instructions for computing device 100 to add the identifying information to a database managed by computing device 100 that reflects data access to the different data controlled by a storage array. This is because a storage array may manage different storage pools. A host device may not have permission to access all the storage pools. Thus, the internal database may keep track of which storage pools are accessible to which adapters depending on policies set by an administrator. The identifying information of the adapter would allow the storage array to allow the adapter access to the accurate storage pool. A storage pool may include at least one storage volume. The storage pool that the identifying information is added to should be a storage pool that includes the storage volume.

As discussed above, data network 120 may include different zones. Thus, in some examples, instructions 115 includes instructions for computing device 100 to query the management controller, over the management network 121, for the name of the zone that the supported adapter is connected to in the data network 120. This zone may be characterized as a current zone of the supported adapter. Instructions 115 may also include instructions to compare the current zone of the supported adapter to the zone of the storage array (i.e. storage array zone). In examples where the current zone is the same as the storage array zone, this means that the storage array and the supported adapter are already in the same zone and thus may communicate to each other. In these examples, the zones do not need to be changed. In examples where the current zone is different from the storage array zone, this means that the storage array and the supported adapter are not in the same zone and thus may not communicate with each other. In these examples, instructions 115 may include instructions for computing device 100 to add the identifying information of the supported adapter to the storage array zone and remove the identifying information of the supported adapter from the current zone. These instructions may include instructions to communicate to another computing device (e.g, a switch) in the data network 120 (not shown). The other computing device may update a zoning database that it keeps. This allows the storage array and the supported adapter to see each other and thus communicate to each other over data network 120. In some examples, instead of querying the management controller for the identifying information of the supported adapter and/or the current zone of the supported adapter, instructions 115 may include instructions for computing device 100 to receive the identifying information of the supported adapter and/or the current zone from a user input. Thus, in these examples, an administrator of the storage array may input the identifying information of the supported adapter and/or the current zone.

In other examples, an administrator may not want to use the identifying information that is already assigned to the supported adapter and may want to assign new identifying information to the supported adapter. Thus, in these examples, instructions 115 may include instructions for computing device 100 to receive the new identifying information for the supported adapter. The new identifying information may come from the user using a user interface of the storage array. Instructions 115 may also include instructions for computing device 100 to transmit, over management network 121, the new identifying information to the management controller on host device 130. This allows the management controller on host device 130 to assign the new identifying information to the supported adapter. Because the identifying information for the supported adapter is new, the new identifying information will not yet be in the storage array zone. Thus, instructions 115 may also include instructions for computing device 100 to add the new identifying information for the supported adapter to the storage array zone.

In some examples, instructions 115 may include instructions for computing device 100 to transmit a command to management controller such that the management controller performs the operations to allow the supported adapter to boot from the storage array. This command may be interpreted by the management controller to change the configuration on the supported adapter. For example, the supported adapter may have an option in its configuration that may be enabled which allows it boot from a storage array.

From the command sent by computing device 100, the management controller may understand to change this option in the supported adapter from disabled to enabled. The transmission of the command is over management network 121.

Figure 2:
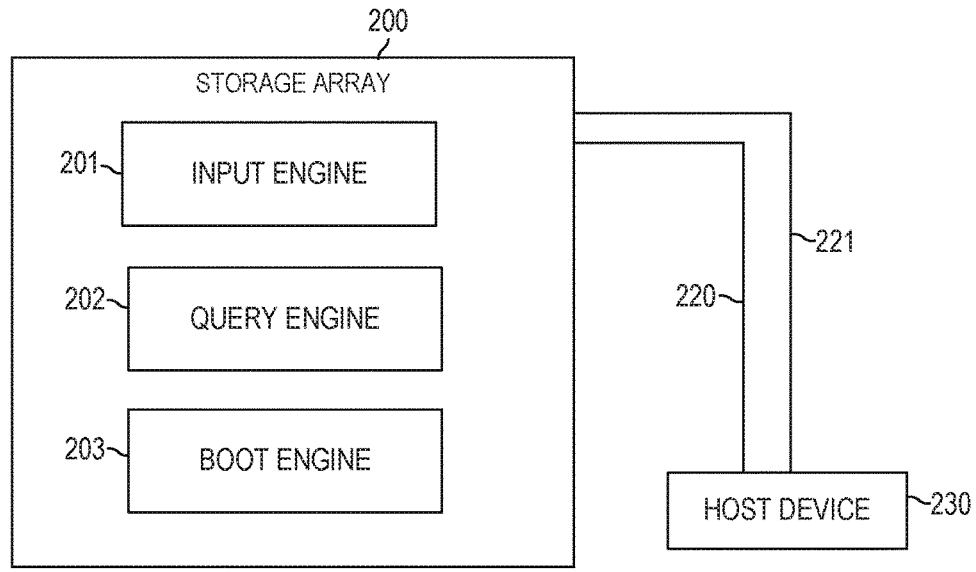
FIG. 2 is a block diagram of a storage array with a boot engine to configure an adapter of a host device, according to some examples.
Figure 4:
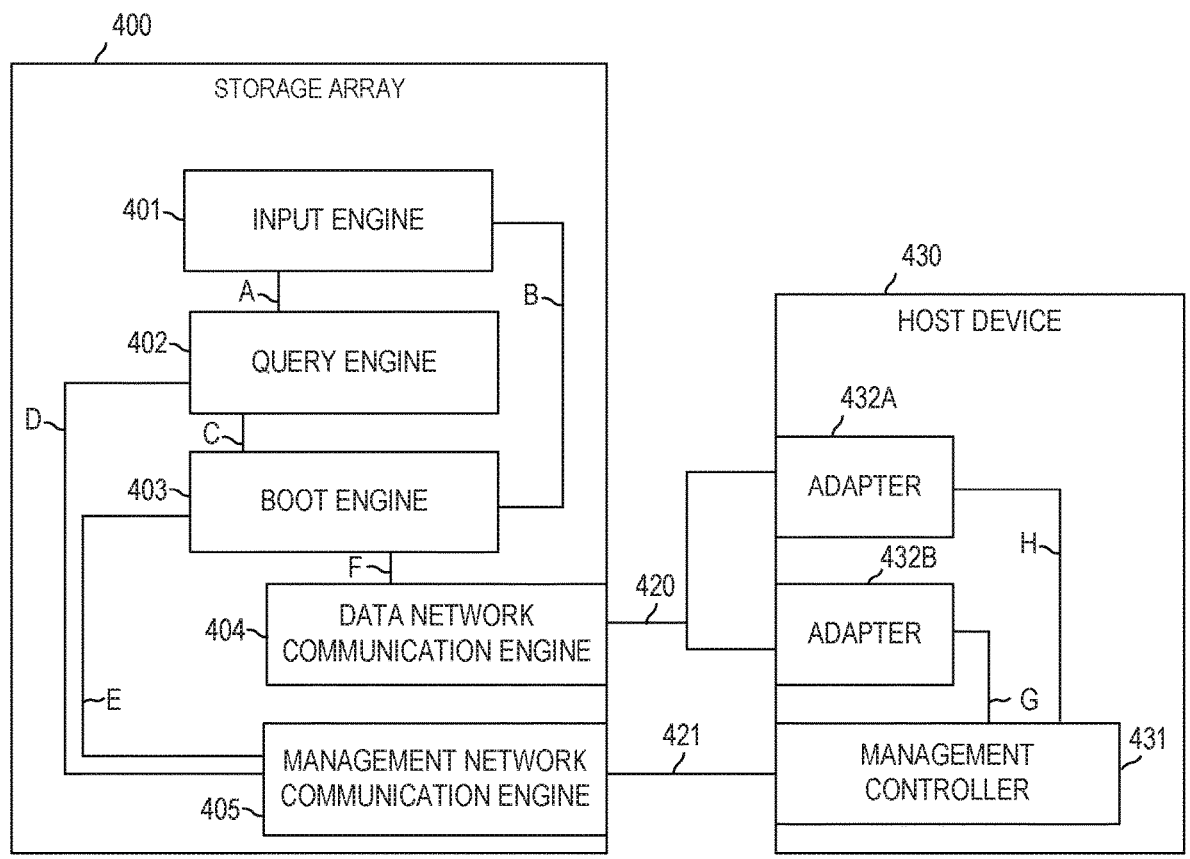
FIG. 4 is a block diagram of a storage array interacting with adapters on a host device, according to some examples.

Computing device 100 of FIG. 1, which is described in terms of processors and machine-readable storage mediums, may include one or more aspects of storage array 200 of FIG. 2 or storage array 400 of FIG. 4, which are described in terms of functional engines containing hardware and software.

FIG. 2 is a block diagram of a storage array 200 that may configure a supported adapter on host device 130. As used herein, a storage array may include a computing device that may handle access commands (read, write, etc.) for data stored in a persistent storage space (e.g., flash drives, hard disk drives, solid state drives, etc.). The storage array may include the persistent storage space or may communicate to the persistent storage space. Storage array 200 may include input engine 201, query engine 202, and boot engine 203. Each of these aspects of storage array 200 will be described below. Other engines may be added to storage array 200 for additional or alternative capabilities.

Each of engines 201, 202, 203, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, storage array 200 may include additional engines.

Each engine of storage array 200 can include at least one machine-readable storage mediums (for example, more than one) and at least one processing resource (for example, more than one). For example, software that provides the functionality of engines on storage array 200 can be stored on a memory of a computer to be executed by a processing resource of the computer. In some examples, each engines of storage array 200 may include hardware in the form of a microprocessor on a single integrated circuit, related firmware, or other software for allowing microprocessor to operatively communicate with other hardware of storage array 200.

Storage array 200 is connected to host device 230 via two communication networks: data network 220 and management network 221. Management network 221 is out of band in relation to data network 220.

Input engine 201 includes a combination of hardware and software that allows storage array 200 to receive contact information of a management controller for host device 230. Contact information, as described above in relation to computing device 100, is applicable here. In some examples, the contact information may come from another computing device. Thus, input engine 201 may include circuitry to communicate to other computing devices. In some examples, the other computing device may be connected to management network 221 and/or data network 220. In yet other examples, the other computing device may be connected to a communication network (not shown in FIG. 2) that is different from management network 121 and data network 120. In some examples and as described above in relation to instructions 112, the contact information may come from a user. Accordingly, input engine 201 may implement or interact with a graphical user interface (GUI) (e.g. a GUI that allows a user to "log-in" to the storage array 200) and may be associated with an input device such as a touchscreen, keyboard, mouse, etc. Input engine 201 may also allow storage array 200 to receive other type of information that is described below in relation to query engine 202 and boot engine 203.

Query engine 202 includes a combination of hardware and software that allows storage array 200 to query the management controller for a supported adapter on host device 230. The querying of the management controller is over (i.e. transmitted via) management network 221. Supported adapter, as discussed above in relation to computing device 100, is also applicable here. Query engine 202 may have knowledge of the protocols used by data network 220. In some examples, query engine 202 may query the management controller on host device 230 specifically for the type of adapter that is compatible with the protocols used by data network 220 to see if that type of adapter is present on host device 230. In other examples, query engine 202 may query the management controller for a list of adapters on host device 230. Query engine 202 may compare the types of adapters for an adapter that is compatible with the protocols used by data network 220. Query engine 202 may also allow storage array 200 to query for other types of information that is described below in relation to boot engine 203.

Boot engine 203 includes a combination of hardware and software that allows storage array 200 to send identifying information of storage array 200 to the management controller and to configure the supported adapter to boot from a storage volume associated with storage array 200. The sending of identifying information and the configuration is in response to a determination that the management controller comprises a supported adapter. Thus, the determination of a supported adapter by query engine 202 may trigger boot engine 203. In some examples, the sending of the identifying information of storage array 200 and the configuration of the supported adapter is via management network 221. The supported adapter is configured to boot via data network 220.

In some examples, other actions may also be triggered in response to a determination that host device comprises a supported adapter. For example, input engine 201 may receive an identifier for storage volume associated with storage array 200. The identifier may come from a user that interacts with storage array 200 via a GUI and/or an input device such as a touchscreen, keyboard, etc. Thus, a user is able to set the storage volume from which the user wishes the supported adapter on host device 230 to boot from. Accordingly, the configuration of the supported adapter by boot engine 203 may include transmitting the identifier of the storage volume to the management controller over the management network. This allows management controller to send the unique identifier to the supported adapter such that the correct storage volume is used during booting of the supported adapter over data network 220.

Another action that may be triggered in response to a determination that host device comprises a supported adapter is that query engine 202 may query the management controller for identifying information of the supported adapter. Identifying information of the supported adapter, as discussed above in relation to computing device 100 is applicable here. The querying is over management network 221. Additionally, query engine 202 may query the management controller for the zone in which supported adapter is in in the data network (i.e. current zone). Boot engine 203 may have knowledge of which zone storage array 200 is in in the data network (i.e. storage array zone) and may thus determine whether the current zone is the same as the storage array zone. In response to a determination that current zone of the supported adapter is different from the storage array zone, boot engine 203 may add the identifying information of the supported adapter to the storage array zone such that storage array 200 and the supported adapter on host device 230 may see each other as endpoints in data network 221.

In some examples, and as discussed above in relation to computing device 100, a user of the storage array 200 may not want to use the existing identifying information of the supported adapter and may want to assign new identifying information to a supported adapter. In these examples, input engine 201 may receive a signal that indicates that a user wishes to assign new identifying information. The signal may come from a user interacting with the storage array 200 via a GUI, etc. For example, the GUI may allow the user to indicate that the user wishes to assign new identifying information and may then allow the user to input the new identifying information. In some examples, the new identifying information may be automatically assigned by another computing device and is not inputted by the user. In either examples, input engine 201 may receive the new identifying information. This information is then relayed to boot engine 203. Boot engine 203 may transmit the new identifying information to the management controller over management network 221. This allows management controller to assign the new identifying information to the supported adapter. In examples where new identifying information is used, boot engine 203 may allow storage array 200 to add the new identifying information to the storage array zone such that storage array 200 and the supported adapter on host device 230 may see each other as endpoints in data network 220.

Boot engine 203 and query engine 202 may also allow storage array 200 to boot the supported array and verify the configuration of the supported array. For example, query engine 202 may query the management controller to determine whether the transmitted information (e.g., the identifying information for the storage array, the new identifying information for the adapter) is accurately reflected. Additionally, boot engine 203 may issue a signal to management controller to signal that the management controller should boot (or re-boot) host device 230 such that adapter may be re-configured according to the new settings. The querying of the management controller to verify the configuration is over management network 221. The signal for booting is also over management network 221.

While FIG. 2 is described with one adapter, storage array 200 may configure multiple adapters. For example, in a host device comprising at least two adapters, input engine 201, query engine 202, and boot engine 203 may perform the steps described above for each adapter. Thus, query engine 202 may determine that there are two supported adapters. Input engine 201 may receive two inputs for identifying information for two different storage volumes, one for the first supported adapter, and another for the second supported adapter. Likewise, in examples where a user wants to assign new identifying information to the supported adapters, input engine 201 may receive two inputs for new identifying information, one for the first supported adapter and another for the second supported adapter. Boot engine 203 may configure each adapter to boot from the identified storage volume.

In some examples, input engine 201, query engine 202, and boot engine 203 may interact with a graphical user interface (GUI). For example, boot engine 203 may indicate, via a GUI, to a user that a configuration of a supported adapter is successful or unsuccessful. As another example, input engine 201 may generate questions for a user to answer via a GUI, such as whether or not the user wishes to assign new identifying information to a supported adapter, etc.

Storage array 200 of FIG. 2, which is described in terms of functional engines containing hardware and software, may include one or more aspects of computing device 100 of FIG. 1 or storage array 400 of FIG. 4.

Figure 3:
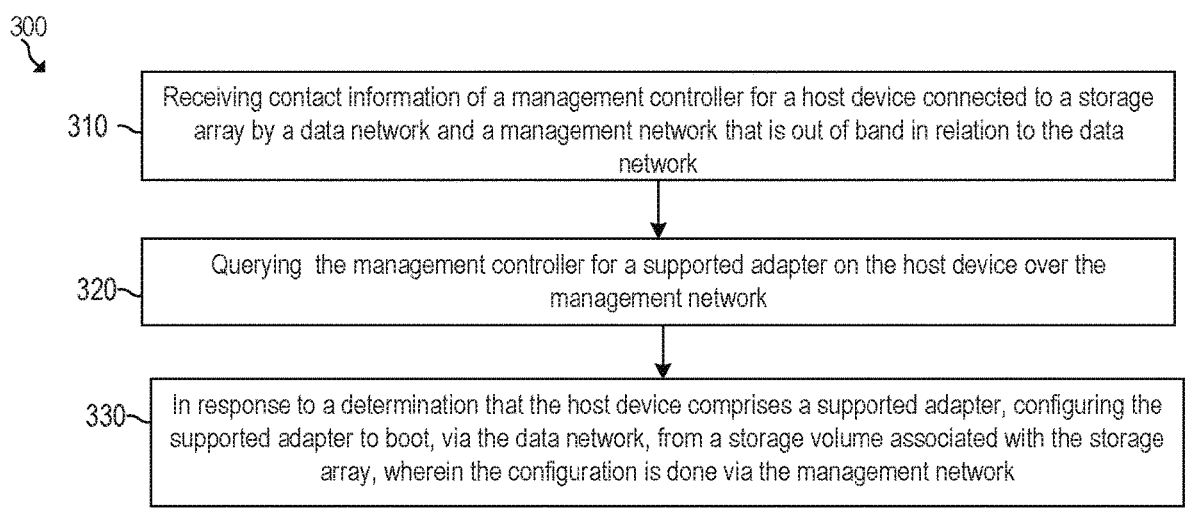
FIG. 3 is a flowchart of a method of configuring a host device adapter, according to some examples.

FIG. 3 illustrates a flowchart for an example method 300 to configure a host device adapter. Although execution of method 300 is described below with reference to storage array 200 of FIG. 2, other suitable systems for execution of method 300 may be utilized (e.g., computing device 100 or storage array 400). Additionally, implementation of method 300 is not limited to such examples and method 300 may be used for any suitable device or system described herein or otherwise.

At 310 of method 300, input engine 201 may receive contact information of a management controller for host device 230. Host device 230 is connected to a storage array 200 by data network 220 and an out of band management network 221. At 320 of method 300, query engine 202 may query the management controller for a supported adapter on the host device. As discussed above, the querying is over (i.e. transmitted over) management network 221. At 330 of method 300, boot engine 203 may configure a supported adapter to boot from a storage volume associated with storage array 200. The configuration is done in response to a determination that host device 230 comprises a supported adapter. The configuration is over management network 221 while the supported adapter is configured to boot via data network 220. Although the flowchart of FIG. 3 shows certain functionalities as occurring in one step, the functionalities of one step may be completed in at least one step (e.g., in multiple steps).

FIG. 4 is a block diagram of a storage array 400 interfacing with a host device 430. Storage array 400 and host device 430 are connected to each other by a data network 420 and an out of band management network 421. Host device 430 may include a management controller 431 and two adapters 432A and 432B. Host device 430 is not limited to the number of adapters shown in FIG. 4. Thus, in other examples, host device 430 may have fewer or additional adapters.

Management controller 431 may be a combination of software and hardware that allows host device 430 to control and manage adapters 432A and 432B and other ports and/or hardware devices, etc. that are on host device 430. The management and/or control of adapters 432A and 432B is represented in FIG. 4 by lines H and G, respectively. As discussed above, in some examples, management controller is a baseline management controller (BMC). Management controller 431 may also allow host device 430 to connect to management network 421. Thus, in some examples, where management network 421 uses Ethernet, management controller 431 may include an Ethernet port that may receive cables used in an Ethernet network. Management controller 431 may also implement protocols that are used in management network 421 to allow host device 430 to be recognized in management network 422 and to receive and transmit information over management network 422.

Adapters 432A and 432B may include a combination of software and hardware that allow host device 430 to communicate to storage array 400 regarding storage requests with data stored in storage array 400. For example, adapters 432A and 432B may allow host device 430 to send write commands to a storage volume stored on storage array 400. Adapters 432A and 432B may allow host device 430 to receive acknowledgement from storage array 400 that the write command is complete. Adapters 432A and 432B may be redundantly connected to storage array 400 such that host device 430 is still able to connect to storage array 400 over data network 420 in the event one adapter 432A or 432B fails. Accordingly, adapters 432A and 432B are supported adapters because they are compatible with the protocols used to implement data network 420 and allow host device 430 to communicate with storage array 400. In some examples, adapters 432A and 432B may be host bus adapters (HBA). Host device 430 may include additional adapters, including adapters that may be used for read/write commands for a data storage system. However, these adapters are not supported adapters (i.e. not compatible with data network 420).

Storage array 400 comprises an input engine 401, a query engine 402, a boot engine 403, a data network communication engine 404, and a management network communication engine 405. Input engine 401 may performance the functionalities described herein in relation to input engine 201, query engine 402 may performance the functionalities described herein in relation to query engine 202, and boot engine 403 may performance the functionalities described herein in relation to boot engine 203. In some examples, the descriptions of engines 201, 202, and 203, also apply to engines 401, 402, and 403, respectively.

Data network communication engine 404 may be a combination of hardware and software that allows storage array 400 to receive communications over data network 420. In some examples, the communication may comprise storage requests (e.g., read, write, etc.) regarding data stored in storage array 400 over data network 420. Thus, in some examples where data network 420 is fiber channel, data network communication engine may include an optical cable port. In some examples, data network communication engine 404 may include a host bus adapter (HBA) that allows storage array 400 to communicate with host device 430 and process data commands from host device 430 over data network 420. In some examples, data network communication engine 404 may include at least two HBAs to provide redundancy connection to host device 430 (specifically adapters 432A and 432B of host device 430). Thus, in the event one HBA fails, storage array 400 is still able to connect to host device 430 over data network 420. In some examples, data network communication engine may be implemented by at least one controller (e.g., two controllers, etc.)

Because data communication engine 404 allows storage array 400 to receive storage requests from supported adapters, data network communication engine 404 may not receive these storage requests until the supported adapter is configured. Thus, in some examples, data network communication 404 may interact with boot engine 403 to send boot engine 403 a signal when data network communication engine 404 receives the storage requests. This interaction between boot engine 403 and data network communication engine 404 is represented by line F in FIG. 4. Boot engine 403 may use this signal to determine whether the configuration of the supported adapter was successful.

Management network communication engine 405 may be a combination of software and hardware that allows storage array 400 to connect to host device 430 over management network 421. Thus, in some examples, where management network 421 uses Ethernet, management network communication engine 433 may include an Ethernet port that may receive cables used in an Ethernet network. Management network communication engine 405 may also implement protocols that may be used in management network 421.

Because query engine 402 queries management controller 431 over management network 421 (e.g., querying for supported adapters, querying for identifying information of the adapters), query engine 402 may send and receive signals to and from management network communication engine 405 (which may, for example, transform the received information to a form that may be transmitted over management network 421). This interaction between query engine 402 and management network communication engine 405 is represented by line D in FIG. 4. Additionally, because boot engine 403 may transmit information to management controller 431 (e.g., transmitting identifying information of storage array 400, transmitting a unique identifier of a storage volume, etc.), boot engine 403 may send and receive signals to and from management network communication engine 405. Management network communication engine 405 may transform the received information from a received form to a form that is transmittable over management network 421. This interaction between boot engine 403 and management network communication engine 405 is represented by line E in FIG. 4.

As discussed above, the signals received by input engine 401 (e.g., contact information for the management controller, etc.) may be used by query engine 402 and/or boot engine 403. Additionally, as also discussed above, the determinations made by query engine 402 may trigger some actions by input engine 401 and/or boot engine 403. The interactions between these engines are represented by lines A, B, and C.

In FIG. 4, host device 430 has at least two supported adapters 432A and 432B. Storage array 400 may determine that both adapters 432A and 432B are supported using query engine 402 and boot engine 403 may configure both adapters. In some examples, each adapter may be configured differently from each other. For example, adapter 432A may be configured to boot from one storage volume associated with storage array 400 and adapter 432B may be configured to boot from a different storage volume associated with storage array 400. Likewise, adapter 432A may be assigned one new identifying information (e.g., WWN) and adapter 432B may be assigned different new identifying information. Accordingly, input engine 401 may receive separate inputs associated with adapter 432A and adapter 432B (e.g., a first new identifying information for adapter 432A and a second new identifying information for adapter 432B). Similarly, query engine 402 and boot engine 403 may perform operations as described above to both adapters.

In some examples, management network 421 and data network 420 may include additional devices. Thus, storage array 400 may be connected to additional host devices (not shown in FIG. 4) other than host device 430 via both management network 421 and data network 420. These additional host devices may also include adapters. Storage array 400 may receive the contact information for management controller on these host devices (using input engine 401), query the management controllers (using query engine 402), and configure the adapters on these additional host devices (using boot engine 403). Thus, the operations described above in relation to input engine 401, query engine 402, and boot engine 403 may apply to additional host devices.

Accordingly, an administrator may interact solely with storage array 400 to configure multiple adapters on one host device, and adapters on multiple host devices to boot from data in data network 420. The configuration described does not include a pre-boot configuration on the host devices.

Storage array 400 of FIG. 4, which is described in terms of functional engines containing hardware and software, may include one or more aspects of computing device 100 of FIG. 1 or storage array 200 of FIG. 2.

Figure 5:
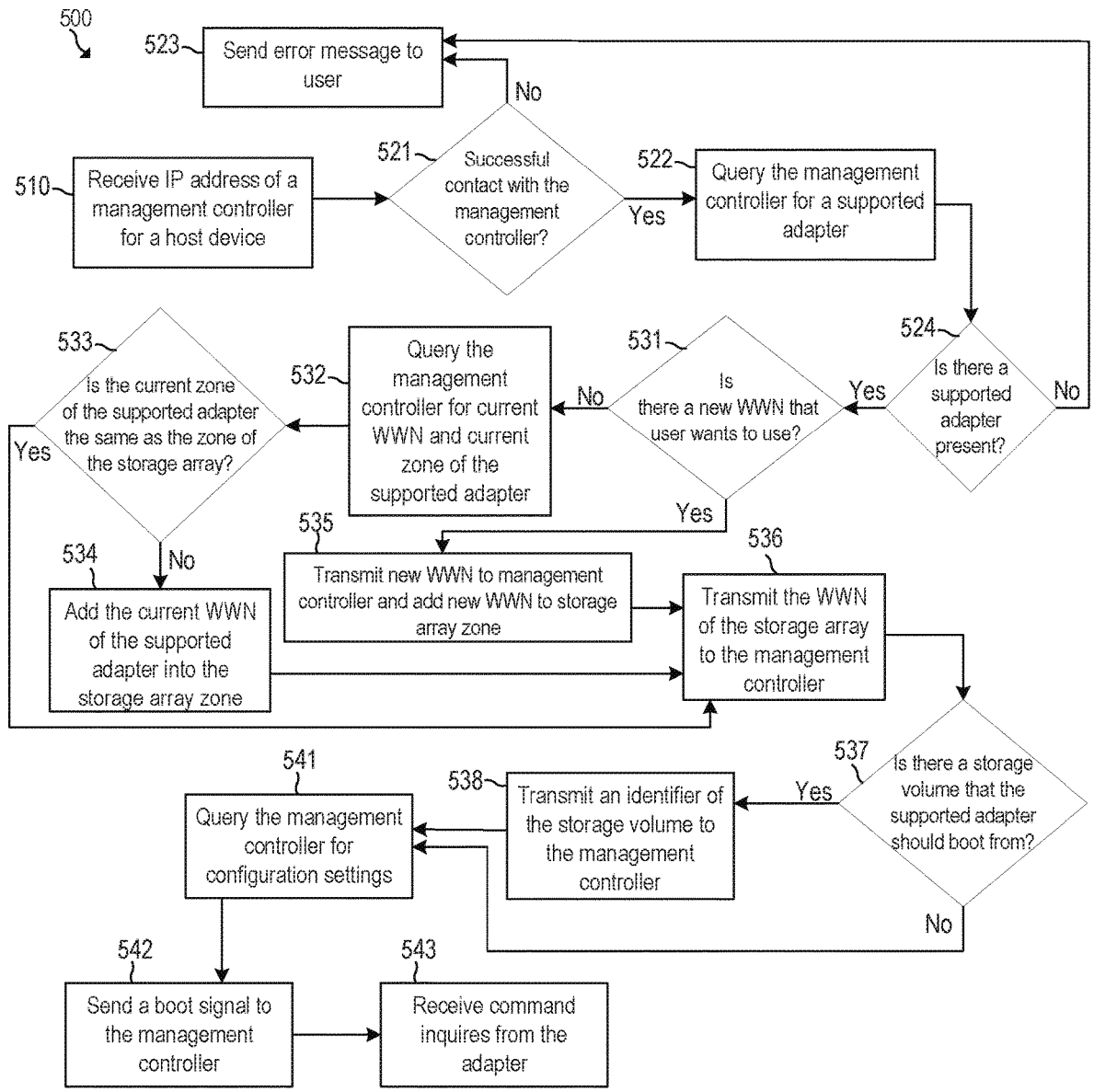
FIG. 5 is a flowchart of a method of configuring a host device adapter and verifying the configuration, according to some examples.

FIG. 5 illustrates a flowchart for an example method 500 to configure a host device adapter and verify the configuration. Although execution of method 500 is described below with reference to storage array 400, other suitable systems for execution of method 400 may be utilized (e.g., computing device 100 or storage array 200). Additionally, implementation of method 500 is not limited to such examples, and method 500 may be used for any suitable device or system described herein or otherwise.

At 510 of method 500, input engine 401 receives contact information for management controller 431 of host device 430. In some examples, the contact information is the IP address of the management controller. As discussed above, in some examples, the contact information may come from an input from a user interacting with a GUI. At 521 of method 500, management network communication engine 405 may determine whether it may successfully contact management controller 431 using the contact information received by input engine 401. Based on a determination that contact is unsuccessful, method moves to 523, where an error message is sent to the user. Based on a determination that contact is successful, method 500 moves to 522.

At 522, query engine 402 queries management controller 431 for a supported adapter. Thus, query engine 402 has knowledge of what protocols are used by data network 420. In some examples, query engine 402 may specifically query for the adapters that may implement those protocols. In some examples, query engine 402 may query for the types of adapters on host device 430 and then compare the types to see if any are supported.

At 524, query engine 402 determines if there is a supported adapter present on host device 430. Based on the determination that the host device does not comprise a supported adapter, method 500 moves to 523, where an error message is sent to a user of storage array 400. Based on the determination that the host device comprises a supported adapter, method proceeds to 531. In the example of FIG. 4, query engine 402 determines there are two supported adapters 432A and 432B.

At 531, input engine 401 determines whether a user wants to assign new identifying information to the supported adapter. In some examples, input engine 401 may do this by looking at whether an input was received by input engine 401 to indicate that the user wants to assign new identifying information. This input may include the new identifying information that the user wants to use. In some examples, the identifying information of the supported adapter is a world wide name (WWN). Based on a determination that there is no new identifying information, method 500 proceeds to 532.

At 532, query engine 402 queries management controller 431 for the identifying information of the adapter 432A. In some examples, the identifying information may be the current WWN of adapter 432A. At 532, query engine 402 also queries management controller 431 for the current zone of supported adapter 432A.

At 533, boot engine 403 determines if the current zone of adapter 432A is the same as a zone of the storage array. Based on a determination that the current zone is the same as the zone of the storage array, method proceeds to 536. Based on a determination that the current zone is not the same as the zone of the storage array, method proceeds to 534.

At 534, boot engine 403 adds the current identifying information of adapter 432A (received at 532) to the storage array zone. This allows storage array 400 and adapter 432A to recognize each other over data network 420. Method 500 then moves to 536, described below.

Referring back to 533, based on a determination that the current zone is the same as the zone of the storage array, method proceeds to 536. At 536, boot engine 403 transmits the identifying information of the storage array to management controller 431. In some examples, the identifying information of the storage array is its WWN.

Referring back to 531, if there is new identifying information that the user wants to assign to adapter 432A, method proceeds to 535. At 535, boot engine 403 transmits the new identifying information for the adapter 432A to the management controller 431. Additionally, boot engine 403 adds the new identifying information assigned to adapter 432A to the storage array zone. Method then proceeds to 536. 536 is described above.

From 536, method proceeds to 537. At 537, boot engine 403 determines if there is a storage volume that adapter 432A is to boot from. This may be determined by seeing whether if input engine 401 received a signal indicating that the user wants to use a storage volume associated with storage array 400. The signal may include an identifier that is entered by the user via a GUI and received by input engine 401. As discussed above, the identifier may be of the storage volume associated to storage array 400.

Based on a determination that there is a storage volume, method proceeds to 538. At 538, boot engine 403 transmits the identifier of the storage volume to management controller 431. The unique identifier may be received by input engine 401. Method proceeds to 541, described below.

Referring back to 537, based on a determination that there is a storage volume, method proceeds to 541.

At 541, query engine 402 may query management controller 431 to determine whether the accurate configuration settings are captured by the management controller. For example, in situations where a user wishes to assign new identifying information to adapter 432A, query engine 402 may query the management controller 431 to see whether adapter 432A now has the new identifying information (that was transmitted at 535). As another example, query engine 402 may also query management controller 431 to determine whether the identifying information of the storage array (transmitted at 536) is accurately captured management controller 431. The querying is via management network 421.

At 542, boot engine 403 sends a signal (i.e. boot signal) to management controller 431 such that management controller 431 starts up (or shuts down and starts up host, if host device 430 is already running) host device 430. This allows the adapter 432A to adopt the configuration set by storage array 400 (described at 510-538). The signal is sent over management network 421. At 543, data network communication engine 404 may receive inquiry commands from adapter 432A. These inquiry commands may be expected of an adapter that is successfully booting using the storage volume as identified by the identifier. These inquiries are transmitted over the data network 420. In some examples, there may be a time limit to when these command inquiries are to be received that indicate whether or not the adapter is successfully configured. For example, if data network communication engine 404 does not receive the expected command inquiry from adapter 432A in the pre-defined time period, then there may be a problem with the adapter configuration. Thus, data network communication engine 404 may send a signal to boot engine 403 when it receives the expected inquiry commands. Based on existence of this signal and the timing of this signal, boot engine 403 may determine that adapter is successfully configured. For example, if boot engine 403 receives a signal indicating that adapter is communicating to data network communication engine 404 within 5 minutes of the boot command, then boot engine 403 may determine that adapter is successfully configured. If boot engine 403 does not receive a signal at all or receives a signal after the 5 minutes, then boot engine may determine that the adapter was not configured successfully. Boot engine 403 may then send an error message to the user.

Because host device 430 has two adapters, steps 531-541 may be done for both adapters 432A and 432B. Accordingly, adapter 432A may be configured to boot from a different storage volume than adapter 432B. In some examples, the boot command from boot engine 403 may be sent after steps 531-541 are completed for both adapters 432A and 432B. This may limit additional restarting of host device 430.

Although the flowchart of FIG. 5 shows certain functionalities as occurring in one step, the functionalities of one step may be completed in at least one step (e.g., in multiple steps). Additionally, although FIG. 5 shows certain functionalities as occurring in a certain order, in other examples, the functionalities of the steps may occur in a different order.

For example, 541 may be done after 543. Additionally, in some examples, functionalities described herein in relation to FIG. 5 may be provided in combination with functionalities described herein in relation to any of FIGS. 1-4.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions that, when executed, cause a processing resource of a storage array to:
   receive contact information of a management controller for a host device;
   query the management controller, over a management network, for a supported data network adapter on the host device;
   in response to a determination that the host device comprises a supported data network adapter:
      transmit identifying information of the storage array to the management controller;
      query the management controller for identifying information of the supported data network adapter;
      query the management controller for a current zone of the supported data network adapter in the data network; and
      in response to a determination that the current zone is different from a storage array zone in the data network, add the identifying information of the supported data network adapter to the storage array zone;
   receive an identifier of a storage volume associated with the storage array; and
   with the storage array and over the management network, configure the supported data network adapter of the host device to boot from the storage volume over a data network that is out of band in relation to the management network.

2. The storage medium of claim 1, wherein the transmission of the identifying information is over the management network.

3. The storage medium of claim 1, wherein the instructions to configure the supported data network adapter to boot from the storage volume comprise instructions, that when executed, cause the processing resource to transmit the unique identifier to the management controller over the management network.

4. The storage medium of claim 1, comprising instructions that, when executed, cause the processing resource to:
   receive new identifying information for the supported data network adapter; and
   transmit the new identifying information to the management controller over the management network.

5. The storage medium of claim 4, comprising instructions that, when executed, cause the processing resource to add the new identifying information to a storage array zone in the data network.

6. The storage medium of claim 1, comprising instructions that, when executed, cause the processing resource to:
   send a boot signal to the management controller over the management network; and
   verify an accurate configuration of the supported data network adapter.

7. A storage array comprising:
   a processing resource; and
   a machine-readable storage medium comprising instructions executable by the processing resource of the storage array to:
      receive contact information of a management controller for a host device;
      query, over a management network, the management controller for a supported adapter on the host device; and
      in response to a determination that the host device comprises a supported adapter:
         send identifying information of the storage array to the management controllers;
         query the management controller for identifying information of the supported adapter;
         query the management controller for a current zone of the supported adapter in the data network; and
         with the storage array, configure the supported adapter of the host device to boot, via a data network, from a storage volume associated with the storage array, wherein the data network is out of band in relation to the management network.

8. The storage array of claim 7, wherein the instructions are executable to configure the supported adapter over the management network.

9. The storage array of claim 7, wherein the instructions are executable to:
   receive new identifying information for the supported adapter;
   transmit the new identifying information to the management controller over the management network; and
   add the new identifying information to a storage array zone of the storage array.

10. The storage array of claim 7, wherein:
    the instructions are executable to, in response to a determination that the current zone is different from a storage array zone, add the identifying information of the supported adapter to the storage array zone.

11. A method comprising:
    receiving, at a processing resource of a storage array, contact information of a management controller for a host device connected to the storage array by a data network and a management network that is out of band in relation to the data network;
    querying, by the processing resource, the management controller for a supported adapter on the host device over the management network; and
    in response to a determination that the host device comprises a supported adapter:
       querying the management controller for identifying information of the supported data network adapter;
       querying the management controller for a current zone of the supported data network adapter in the data network;
       in response to a determination that the current zone is different from a storage array zone in the data network, adding the identifying information of the supported data network adapter to the storage array zone; and
       with the processing resource of the storage array, configuring the supported adapter on the host device to boot, via the data network, from a storage volume associated with the storage array, wherein the configuration is done via the management network.

12. The method of claim 11, comprising transmitting, by the processing resource, identifying information of the storage array to the management controller.

13. The method of claim 11, comprising:
receiving, at the processing resource, a unique identifier of the storage volume;
wherein configuring the supported adapter comprises transmitting the unique identifier to the host device over the management network.

* * * * *